US011620076B2

(12) United States Patent
Vrooman et al.

(10) Patent No.: US 11,620,076 B2
(45) Date of Patent: Apr. 4, 2023

(54) ACCELERATED NON-VOLATILE MEMORY DEVICE INSPECTION AND FORENSICS

(71) Applicant: Oracle International Corporation, Redwood Shores, CA (US)

(72) Inventors: Tyler Vrooman, Seattle, WA (US); Greg Edvenson, Seattle, WA (US); Matthew King, Seattle, WA (US); Kumud Nepal, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 59 days.

(21) Appl. No.: 17/074,379

(22) Filed: Oct. 19, 2020

(65) Prior Publication Data

US 2022/0121390 A1  Apr. 21, 2022

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ......... G06F 12/0646; G06F 2221/2143; G06F 2209/5014; G06F 21/57; G06F 9/5061
See application file for complete search history.

(56) References Cited

U.S. PATENT DOCUMENTS

| 2014/0047548 A1* | 2/2014 | Bye ........................ G06F 21/74 |
| | | 726/26 |
| 2020/0218821 A1* | 7/2020 | Liu ....................... H04L 63/062 |
| 2020/0327025 A1* | 10/2020 | Li .............................. G06F 8/65 |

OTHER PUBLICATIONS

Mosayyebzadeh et al., A secure cloud with minimal provider trust, 10th USENIX Workshop on Hot Topics in Cloud Computing (HotCloud 18). 2018. [retrieved from internet Feb. 9, 2022][<URL:https://www.usenix.org/system/files/conference/hotcloud18/hotcloud18-paper-mosayyebzadeh.pdf>] (Year: 2018).*
Schearet al., Bootstrapping and maintaining trust in the cloud, Proceedings of the 32nd Annual Conference on Computer Security Applications. 2016. [retrieved from internet Feb. 9, 2022][<URL:https://dl.acm.org/doi/pdf/10.1145/2991079.2991104>] (Year: 2016).*
Mosayyebzadeh et al, Supporting Security Sensitive Tenants in a Bare-Metal Cloud, 2019 USENIX Annual Technical Conference (USENIX ATC 19), 2019 [retrieved from internet Aug. 8, 2022]{<URL:https://www.usenix.org/system/files/atc19-mosayyebzadeh.pdf>] (Year: 2019).*

* cited by examiner

Primary Examiner — David Yi
Assistant Examiner — Nicholas A. Paperno
(74) Attorney, Agent, or Firm — Trellis IP Law Group, PC

(57) ABSTRACT

Example embodiments employ a selective memory swapping system for selectively placing non-volatile memory devices of a computer system offline, e.g., for background updating, and online, for use by a computer system, whereby the background updating process includes a mechanism for performing forensics analysis and updating of offline memory devices while an alternate memory device is usable by a user of the first computer system.

18 Claims, 8 Drawing Sheets

ACCELERATED NON-VOLATILE MEMORY DEVICE INSPECTION AND FORENSICS

CROSS REFERENCES TO RELATED APPLICATIONS

This application is related to the following application, U.S. patent application Ser. No. 17/074,356, entitled PRIORITIZED NON-ACTIVE MEMORY DEVICE UPDATE, filed on Oct. 19, 2020 and U.S. patent application Ser. No. 16/884,002, entitled CONFIGURABLE MEMORY DEVICE CONNECTED TO A MICROPROCESSOR, filed on May 26, 2020 which claims priority to U.S. Provisional Application Ser. No. 62/853,667, entitled CONFIGURABLE MEMORY DEVICE CONNECTED TO A MICROPROCESSOR, filed in May 28, 2019, which are hereby incorporated by reference as if set forth in full in this application for all purposes.

BACKGROUND

The present application relates to computing, and more specifically to software, systems, and methods for enhancing efficiency with which computing resources are recycled in a computing environment, while minimizing downtime of the computing resources.

Systems and methods for selectively recycling computing resources, e.g., computer systems and accompanying memory, data, software, and so on, are employed in various demanding applications, including cloud-based applications involving leasing of computer systems (e.g., servers) to external customers, where accompanying server-side computer systems must be recycled before being turned over to or leased to new customers when prior customers relinquish them. Such applications often demand efficient mechanisms for facilitating recycling computing resources (e.g., so as to prepare them for subsequent users) while minimizing resource downtime and minimizing cloud-based resources required to perform the recycling operations.

In an example cloud-based computing environment, computer systems are recycled; then turned over to a subsequent user. The recycling process may involve digitally sanitizing and updating the computer system, such as by erasing prior data (e.g., data from a prior customer), updating older firmware running on non-volatile memory devices of the computer, and so on.

Conventionally, when a user relinquishes use of their leased computer system, the entire computer system is taken offline while the system is recycled, e.g., by performing a wipe of the non-volatile memory and replacement with new firmware and accompanying data. However, this can result in substantial downtime for the computer system, whereby the host organization loses revenue. Furthermore, use of conventional wiping and reinstallation of firmware and data can be particularly time consuming, thereby further extending computer system downtime.

Alternative approaches to the recycling of computing resources may exhibit similar inefficiencies, such that excessive cloud-based resources may be required for the recycling operations.

SUMMARY

Various embodiments discussed herein implement cloud-based server-side functionality for enabling the inspection (e.g., forensics analysis) of a prior user's non-volatile memory contents, while a new user is potentially simultaneously executing workloads on the accompanying computer system. Each computer system may have multiple non-volatile storage devices (e.g., Network Interface Controllers (NICs), Basic Input/Output System (BIOS) memories, Field Programmable Gate Arrays (FPGAs), etc.).

Embodiments discussed herein may employ forensics background updating of all requisite memory devices on a given computer in parallel or concurrently, such that all memory devices recycled offline can be switched online as needed to meet the needs of a new user, without requiring system downtime, and while ensuring that the prepared/recycled memory devices have not been tampered with, e.g., modified or corrupted in any way. In addition, use of the forensics analysis may further expedite the recycling process, as discussed more fully below.

An example method facilitates selectively updating one or more memory devices of a computer system of a cloud-based computing environment, in preparation for use by a subsequent user, and includes: determining that a current first user of a first computer system that is employing a first memory device is slated to relinquish the first memory device at a future time; preparing a second memory device to be interchanged with the first memory device in preparation for use by the first computer system and accompanying a second subsequent user, wherein preparing further includes: performing forensics analysis on the second memory device, and selectively updating or altering data or code on the second memory device in response to the performing; detecting that the first computer system has been relinquished by the first user; and employing a memory swapping system to position (electronically, as opposed to physically) the second memory device in place of the first memory (i.e., swapping offline and online status, such that the second memory device is placed online, and the first memory device is placed offline) in response to the detecting, thereby enabling a second user to use the computer system in communication with the second memory device.

In a more specific embodiment, the example method further includes employing a cloud service to communicate with the memory swapping system to facilitate preparing the second memory device to be interchanged with the first memory device.

A cloud service may be employed to communicate with a Root of Trust (ROT) processor of the memory swapping system to facilitate the forensics analysis and the selectively updating or altering data. The ROT processor may communicate with a switch to facilitate interchanging (i.e., interchanging the online and offline statuses) the first memory device with the second memory device.

A service processor may communicate with the switch to facilitate interfacing one or more operations of the computer system initiated by a user of the computer system, with the first memory device or the second memory device, depending upon whether the first memory device or the second memory device, respectively, has been prepared, via a background updating process, for use by the computer system.

In an alternative embodiment, the step of employing may further include, in response to the detecting: taking the first memory device offline, while placing the second memory device online; conducting forensics analysis on the first memory device, and producing forensics results in response thereto; using the forensics results to determine data to subsequently write to the first memory device; selectively writing new data to a third memory device that has undergone forensics processing to determine the new data that should be written to the third memory device, so as to prepare the third memory device for electronically positioning in place of the second memory device when the second memory device and accompanying computer system are relinquished by a second user; detecting that the second user has relinquished the computer; and electronically positioning the third memory device in place of the second memory device, such that: the second memory device is taken offline in preparation for forensics analysis; the third memory device is placed online for use by the first computer system and a third user; and the first memory device is electronically positioned in preparation for any rewriting or updating of data thereto, so as to prepare the first memory device for use by a forth user, upon relinquishing of the first computer system and the third memory device used by the third user.

The first memory device and the second memory device may represent non-volatile memories. The computing environment may include or represent a networked computing environment, such as a cloud-based computing environment. The forensics analysis may include employing one or more hashes or Cyclic Redundancy Checks (CRC), or other codes or forensic mechanisms to ascertain an indication as to whether or not a set of data and/or computer code has been modified or otherwise tampered, replaced, or augmented on the first memory device or the second memory device.

A further understanding of the nature and the advantages of particular embodiments disclosed herein may be realized by reference of the remaining portions of the specification and the attached drawings.

DETAILED DESCRIPTION OF EMBODIMENTS

Figure 1:
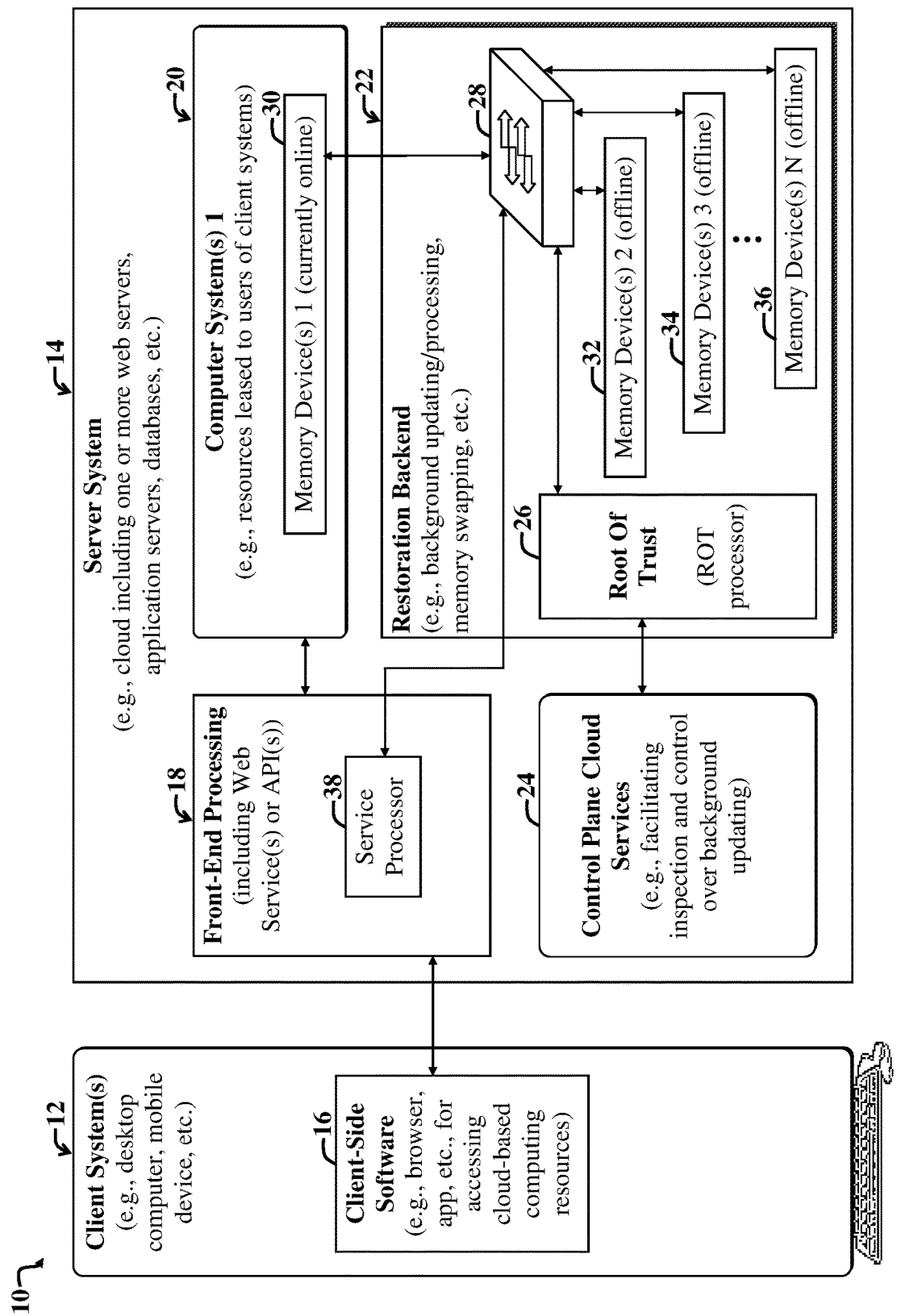
FIG. 1 illustrates a first example system and accompanying computing environment employing a restoration backend to facilitate selectively implementing background updating of computing resources, as may be implemented via one or more cloud services and/or Application Programming Interfaces, and/or code libraries.

Currently, as part of a computer recycle event (also called recycling event herein), e.g., whereby computer systems and accompanying non-volatile memories are sanitized, updated, and/or otherwise prepared for transfer to another user (e.g., customer). Generally regions of non-volatile memory devices that are subject to alteration by users are blindly erased (i.e., wiped); then rewritten with the latest known good data.

However, this approach can lead to extended downtimes for the computer systems being recycled. Not only is the wiping and rewriting process inefficient and tedious, but the computer systems are often taken offline to perform the operations. The time during which a computer system is unavailable for use by others is called "downtime" herein.

Various embodiments discussed more fully below provide systems, methods, functionality that enables substantial performance improvements over such approaches, e.g., in part, by interleaving inspection (including forensics analysis) of the non-volatile memories of computers used by prior customers with the simultaneous or concurrent writing the new known good data to alternate non-volatile memory devices, during a background update process, which is part of a recycling process or operation, as discussed more fully below.

For the purposes of the present discussion, a computing environment may be any collection of computing resources used to perform one or more tasks involving computer processing. A computer may be any processor in communication with a memory. A computing resource may be any component, mechanism, or capability or quantities thereof of a computing environment, including, but not limited to, processors, memories, software applications, user input devices, and output devices, servers, data, and so on.

A networked computing environment may be any computing environment that includes intercommunicating computers, i.e., a computer network. Similarly, a networked software application may be computer code that is adapted to facilitate communicating with or otherwise using one or more computing resources, e.g., servers, via a network.

For the purposes of the present discussion, a server may be any computing resource, such as a computer and/or software that is adapted to provide content, e.g., data and/or functionality, to another computing resource or entity that requests it, i.e., the client. A client may be any computer or system that is adapted to receive content from another computer or system, called a server. A server system may be any collection of one or more servers and accompanying computing resources.

A data center may be any collection of one or more buildings or facilities for accommodating plural computer systems, e.g., servers, and other cloud-based computing resources.

Cloud-based computing resources may be any computing resources accommodated by a data center or other collection of one or more intercommunicating servers.

A cloud service may be any mechanism (e.g., one or more web services, Application Programming Interfaces (APIs), etc.) for enabling a user and/or other software application to employ data and/or functionality provided via a cloud. A cloud may be any collection of one or more servers. For example, certain clouds are implemented via one or more data centers with servers that may provide data, data storage, and other functionality accessible to client devices.

Certain data centers may provide centralized locations for concentrating computing and networking equipment for users to access, consume, and store large amounts of data. Often in collections of computing systems, e.g. cloud computing systems, common resources such as processors and memory are configured for different users to utilize in turn.

Such computing collections utilize rewritable memory, e.g. flash memory, that can be erased once one user is done with it and rewritten for a next user. For example, a cloud service provider must ensure that when a new user begins accessing a cloud resource, the resource is configured properly for a subsequent user and any information from a prior user is unavailable.

For clarity, certain well-known components, such as the Internet, hard drives, processors, power supplies, routers, Internet Service Providers (ISPs), Input/Output (I/O) workflow orchestrators, process schedulers, identity management clouds, process clouds, certificate authorities, business process management systems, database management systems, middleware, and so on, are not necessarily explicitly called out in the figures. However, those skilled in the art with access to the present teachings will know which components to implement and how to implement them to meet the needs of a given implementation.

FIG. 1 illustrates a first example system 10 and accompanying computing environment employing a restoration backend 22 to facilitate selectively implementing background updating of computing resources, as may be implemented via one or more cloud services and/or Application Programming Interfaces, and/or code libraries, such as Root of Trust (ROT) libraries, which may run among or be included within a control plane cloud services module 24.

The example system 10 includes one or more client systems 12 in communication with a server system 14, e.g., via the Internet or other network. The server system 14 may be implemented via a data center and may represent a cloud.

Note that in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings.

For example, while a switch 28 (as discussed more fully below) is shown included in a restoration backend 22, the switch 28 may be considered outside of the restoration backend 22, without departing from the scope of the present teachings. Similarly, a service processor 38 of a front-end processing module 18 may be considered part of the one or more server-side computer systems 20, as opposed to part of the front-end processing module 18, without departing from the scope of the present teachings.

Furthermore, an alternative grouping and arrangement of modules of a system, which may be readily adapted for use with the present teachings (and associated embodiments discussed herein) by those skilled in the art, is discussed more fully in the above-identified and incorporated US Patent Application, entitled CONFIGURABLE MEMORY DEVICE CONNECTED TO A MICROPROCESSOR.

In the present example embodiment, the client system 12 includes client-side software 16 for facilitating accessing data and functionality provided by the server system 14. The example server system 14 includes a front-end processing module 18, which may be implemented via one or more web services and/or Application Programming Interfaces (APIs) and associated processors, including a service processor 38.

For the purposes of the present discussion, software functionality may be any function, capability, or feature, e.g., stored or arranged data, that is provided via computer code, i.e., software. Software functionality may include actions, such as retrieving data pertaining to a computing object (e.g., business object); performing an enterprise-related task, calculating analytics, launching certain dialog boxes, performing searches, implementing forensics analysis algorithms on memory devices, and so on, as discussed more fully below.

The front-end processing module 18 communicates with one or more first computer systems 20, resources of which are selectively leased to users, e.g., customers of a proprietor of the server system 14. Generally, such a first computer system 20 includes one or more first memory devices 30 used to facilitate operations of the first computer system 20. Note that the term "memory device," may be used interchangeably with the term "memory," herein.

Requests to perform operations (that a user of the client system 12 directs the first computer system 20 to perform) are handled by the service processor 38 of the front-end processing, which facilitates interfacing the client system 12 with server-side computing resources, including the first memory device 30 (and accompanying firmware, data, etc.) of the first computer 20, in addition to other computing resources (e.g., processing, operating system software, application software, and so on) provided by the computer system 20.

When the service processor 38 is handling messaging from the client system 12, which may then thereby affect use of the first memory device 30, then the first memory device 30 is said to be online or active, i.e., it's being used or is available for use by the client system 12 via the front-end processing module 18. Similarly, when the first memory device 30 is electronically isolated (e.g., via a switch 28, as discussed more fully below) from the client system 12 and front-end processing module 18, the first memory device 30 is said to be offline or non-active. Note that the service processor 38 may include functionality similar to a Baseboard Management Controller (BMC) for monitoring server (computer system) hardware and communicating with various peripherals, e.g., Field-Programmable Gate Arrays (FPGAs), Basic Input/Output Systems (BIOSs), etc.

In the present example embodiment, the restoration backend 22 includes various modules 26, 28, 32-36 and associated functionality involved in implementing background updating and associated processing of one or more offline memory devices 32-36. The restoration backend 22 communicates with the service processor 38 of the front-end processing 18 and with the first memory device 30 of the first computer system 20.

The various modules 26, 28, 32-36 of the restoration backend 22 include a Root of Trust Processor (ROT) 26 (also called ROT processor herein). The ROT 26 implements functionality for securely interfacing one or more cloud services of the control plane cloud services module 24 with the one or more of the memory devices 32-36 of the restoration back end 22, via the switch 28. The ROT 26 may issue one or more control signals to the switch 28, e.g., to selectively control switching operation of the switch 28, as discussed more fully below.

The switch 28 selectively couples (e.g., in response to one or more control signals issued by the ROT processor 26) the service processor 38 with one or more of the memory devices 30-36. In the present embodiment, the service processor 38 is electrically coupled to the first memory device 30 via the switch 28.

For illustrative purposes, the first memory device 30 is shown included in the first computer system 20. However, the first memory device 30 may or may not be included within the first computer system 20. The switch 28 includes functionality for selectively electrically disconnecting communications between the service processor 38 and the first memory device 30, and reconnecting it to one or more other memories, e.g., one of the currently offline memory devices 32-34.

This switching and reconnecting is called swapping herein. For instance, if the ROT 26 issues a control signal to the switch 28 to disconnect the service processor 38 from the first memory device 30; electronically place the first memory device 30 offline; then connect to the third memory device 34, then the third memory device 34 may be considered part of the first computer system 20, to the extent that the third memory device 34 can then be used by the first computer system 20, whereas the prior first memory 30, gets electronically moved into the restoration backend 22 via the switch 28.

Note that the ROT processor 26 also communicates with one or more cloud services (e.g., web services, Application Programming Interfaces (APIs), etc.) of the control plane cloud services module 24. In the present example embodiment the control plane cloud services module 24 includes modules for implementing functionality (effectuated through the ROT processor 26) to implement forensics analysis and data writing to one or more of the offline memories 32-36 that may be undergoing backend processing, e.g., preparation for being usable to replace the first memory device 30 when another user is assigned the first computer system 20.

By selectively using offline backend processing to prepare the memory devices 32-36 for subsequent use in association with the first computer system 20, while the first memory device 30 is offline, this can obviate any downtime for the first computer system 20.

For instance, when the first computer system 20 is relinquished by a first user of the client system(s) 12, after using the first memory device 30, then the ROT processor 26 can detect this event, e.g., via signaling from one or more cloud services of the control plane cloud services module 24. Upon detection of such a relinquishing event, the ROT processor 26 may then use the switch 28 to electronically swap out the first memory device 30. For instance, the first memory device 30 may be electronically swapped out and replaced with the third memory device 34 that has been sanitized, updated, and otherwise processed in preparation for use by a subsequent user of the first computer system 20.

This swapping time, happening upon turnover of the first computer system 20 from a first user to a second user (or in preparation for turnover to a second user) may be close to zero, such that downtime of the computer system 20 is virtually eliminated.

Note that embodiments discussed herein include additional beneficial technology; not just the offline background processing for the purposes of implementing recycling operations. For instance, as discussed more fully below, the control plane cloud services module 24 includes one or more cloud services (e.g., web services) or other modules for implementing forensics analysis of one or more of the offline memory modules 32-36, in addition to functionality for writing any requisite new data and/or updates to previously forensically analyzed memory devices.

Note that, after forensics analysis is performed on a given offline memory device 32-36, e.g., so as to confirm that the memory device has not been tampered with (e.g., so as to confirm that data and/or firmware or software thereon has not been modified to be different from data and/or from data and/or firmware that is indicated via a known source of trust), then the memory device need not be wiped. Instead, any new updates, e.g., firmware and/or data updates, can be written to the memory device 32-36, without first requiring a wipe of virtually the entire memory device 32-36.

In some cases, e.g., when no firmware and/or data updates are available, no additional data will need to be written to the memory device (e.g., one of the memory devices 32-36) after it passes forensics analysis (e.g., to confirm that no data and/or firmware has changed or is otherwise inappropriate), for the memory device to be considered ready for reuse by a subsequent user of the computer system 20.

Use of the forensics analysis may also facilitate detecting any malicious activity on the server system 14, which might otherwise go undetected when relying merely upon memory wipes to prepare memory devices, i.e., to recycle memory devices for subsequent use in association with the first computer system 20 by a subsequent user.

Note that while in the present example embodiment, the restoration backend 22 operates on offline memory devices 32-26 to prepare them for subsequent online use on the computer system 20, embodiments are not limited thereto. For example, in certain implementations, one or more cloud services of the control plane cloud services module 24 may employ the ROT processor 26 to inspect, i.e., perform forensics analysis, on an online memory, e.g., on the first memory device 30, without departing from the scope of the present teachings.

In the present example implementation, cloud services of the control plane cloud services module 24 are used to forensically inspect the second memory device 32, while any new data (e.g., updates to firmware and/or data) is written to the third memory device 34. At that point, the third memory device 34 had previously been in the position (electronic position) of the second memory device 32, such that forensic inspection has already been performed on the third memory device 34 before any new data is written thereto.

Note that both the second memory 32, undergoing forensics analysis and/or inspection, and the third memory 34, which may be having new data simultaneously written thereto, are currently offline in the embodiment of FIG. 1.

Note however, that embodiments are not limited to the simultaneous backend processing of multiple memory devices (e.g., the second memory device 32, and the third memory device 34). For instance, in certain scenarios, a single offline memory device may pass through forensics processing and any data (and/or firmware) writing, rewriting, and/or updating, while the first memory device 30 is currently in use by the first computer system 20 and accompanying first user of the client system 12. By the time that the user relinquishes the first computer system 20 (and the first memory device 30 must be processed by the restoration backend 22 before use by another customer, and a sanitized and updated second memory must then be placed online for use by the first computer system 20), the background processing of the second memory device 32 will likely have been completed.

However, the embodiment discussed more fully below may process and hold two of the memory devices 32-36 (e.g., the second memory device 32 and the third memory device 36) offline until the first computer system 20 and associated first memory device 30 are relinquished by the user.

Accordingly, in the present example embodiment, after any new data is written to the third memory device 34 while forensics analysis is being performed on the second memory device 32, and after forensics analysis is completed on the second memory device 32, then a waiting period may begin.

The waiting period may involve waiting until the first user of the first computer system 20 relinquishes the first computer system 20. When the first user relinquishes the first computer system 20, then the first memory device 30 is taken offline and electronically positioned (via the switch 28 via one or more controls signals from the ROT processor 26) in place of the second memory device 32, e.g., in preparation for forensics analysis implemented, at least in part, via one or more cloud services of the control plane cloud services module 24.

Simultaneously, the already prepared (background processed in preparation for swapping out the first memory device 30) third memory device 34 is electronically put online for the first computer system 20, while the first memory device 30 is taken offline. In this case, the third memory device 34 is said to take the position of the first memory device 30.

Then, the first memory device 30 will be offline, and will take the place of the second memory device 32, the second memory device 32 will take the place of the third memory device 34. Accordingly, forensics analysis will then be performed on the now offline first memory device 30. Upon the next recycle event (also called recycling event), the first memory will then move to the next position (corresponding to the position of the third memory device 34 in FIG. 1), and the third memory device will (having had any new data written thereto) will advance to online status, thereby electronically replacing the prior memory device used by the first computer system 20.

The cycle of selectively swapping memory devices 30, 32, 34 in a virtual circular queue that includes two processing steps (forensics analysis and new data writing) ensures that efficient forensics analysis and data writing can be performed via the restoration backend while a user may be executing loads on the first computer system 20 and using which ever memory is currently online, e.g., the first memory 30 is shown to be currently online in FIG. 1.

Once the user relinquishes the first computer system 20, a background processed memory device, e.g., the third memory device 34 may be swapped into position (i.e., placed online) for use by the first computer system 20.

Note that while the present example embodiment discussed above uses at least three memory devices as part of a three-stage loop, the additional or fewer stages may be employed, without departing from the scope of the present teachings.

Figure 2:
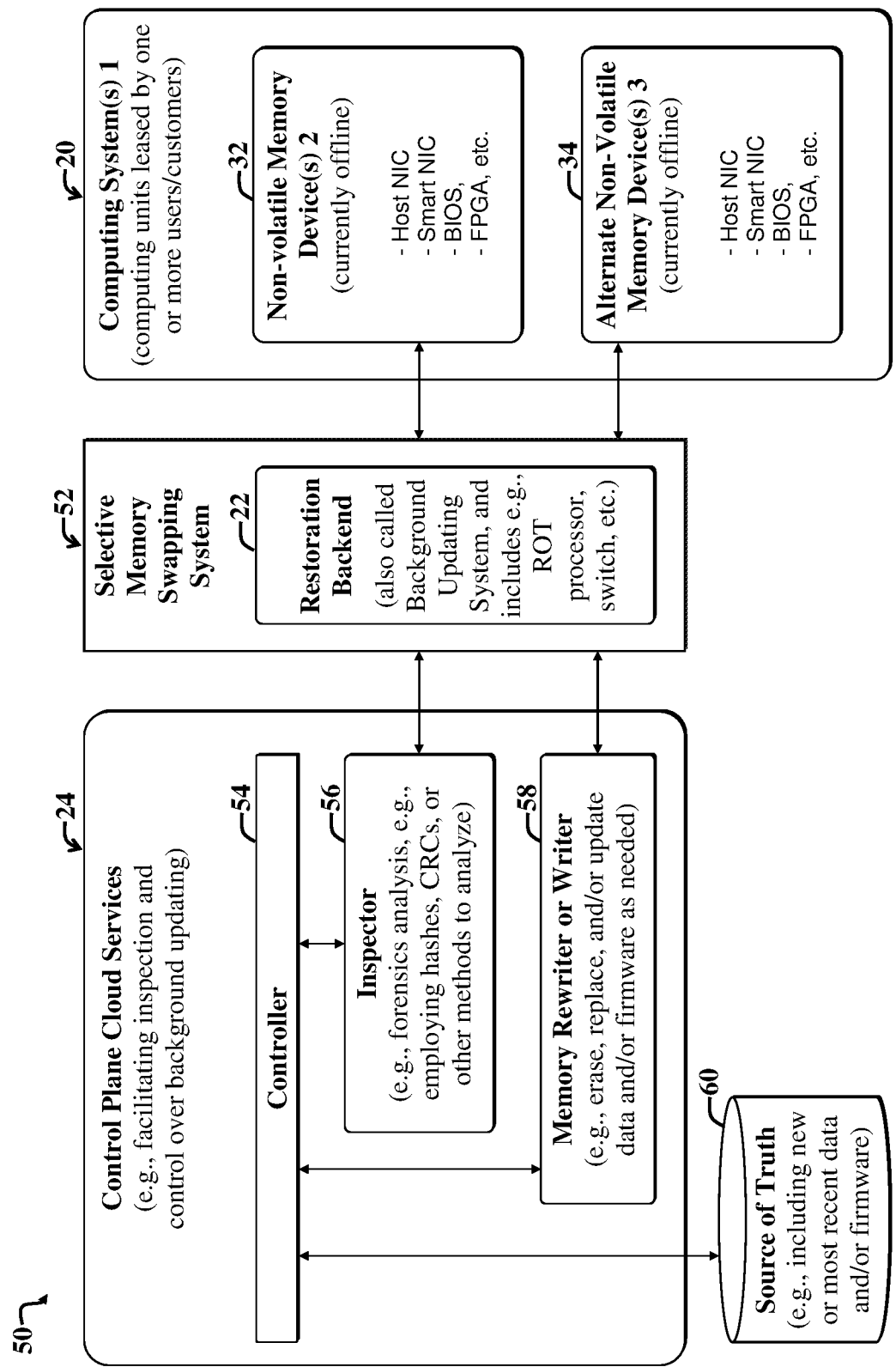
FIG. 2 illustrates a second example system and accompanying computing environment that may be implemented by the first example system of FIG. 1, and which further illustrates example details of control plane cloud services used to selectively employ forensics and background updating.

FIG. 2 illustrates a second example system 50 and accompanying computing environment that may be implemented by the first example system 10 of FIG. 1, and which further illustrates example details of the control plane cloud services module 24 used to selectively employ forensics and background updating. Note that while the first online memory device 30 of FIG. 1 is not shown in FIG. 2, the first computer system 20 of FIG. 2 also includes (or otherwise communicates with or owns) the first memory device 30 of FIG. 1.

The example control plane cloud services module 24 includes a controller 54 in communication with an inspector service (also called inspector module herein) 56, a memory rewriter service (also called a memory rewriter module herein) 58, and a source of truth 60. The source of truth includes 60 data, firmware images, and any other information that may be needed for the inspector module 56 to conduct forensics analysis of one or more memory devices, e.g., the second memory device 32 and the third memory device 34, and any information, e.g., data and/or firmware updates that may be written to one or more of the memory devices 32, 34.

In the present example embodiment, the inspector module 56 and the memory rewriter (and/or writer, as it may also simply perform a write function, without departing from the scope of the present teachings) 58 communicate with the memory devices 32, 34 through a selective memory swapping system 52, that includes the restoration backend 22. The memory swapping system 52 is called a swapping system, as it facilitates (e.g., via the switch 28 of FIG. 1) selectively electronically taking non-volatile memory devices offline (in preparation for recycling via background processing), and placing recycled memory devices online, e.g., when a computer system changes hands, e.g., passed from use by one user or customer to another user or customer.

Note that for illustrative purposes, the offline memories, i.e., the second memory device 32 and the second memory device 34 and shown included on the first computer system 20, even though the memory devices 32, 34 are currently offline and electronically disconnected from any processing that can be performed by a user of the first computer system 20. Accordingly, the physical locations of the offline memory devices 32, 34 may vary, without departing from the scope of the present teachings.

Furthermore, the memory devices 32, 34 are shown including or representing plural memory devices, e.g., hose Network Interface Controller (NIC) memory, a smart NIC, a BIOS memory, a Field Programmable Gate Array memory, and so on. Note that each of the memory devices 32, 34 can represent one or more of, or any combination of such non-volatile memory devices. In the present example embodiment, the second memory 32, the third memory 34, and the first memory 34 are non-volatile memories, i.e., they retain memory when power is disconnected from the associated integrated circuits.

In the present example embodiment, the inspector service 56 includes code and associated functionality for performing forensics analysis, which may include employing hashes and associated function, Cyclic Redundancy Checks (CRCs), and/or other forensics techniques to verify the integrity of data and/or firmware maintained on the non-volatile memories 32, 34 being background processed, e.g., by the control plane cloud services module 24 in communication with the restoration backend 22 (e.g., the ROT 26 thereof, as shown in FIG. 1).

Figure 3:
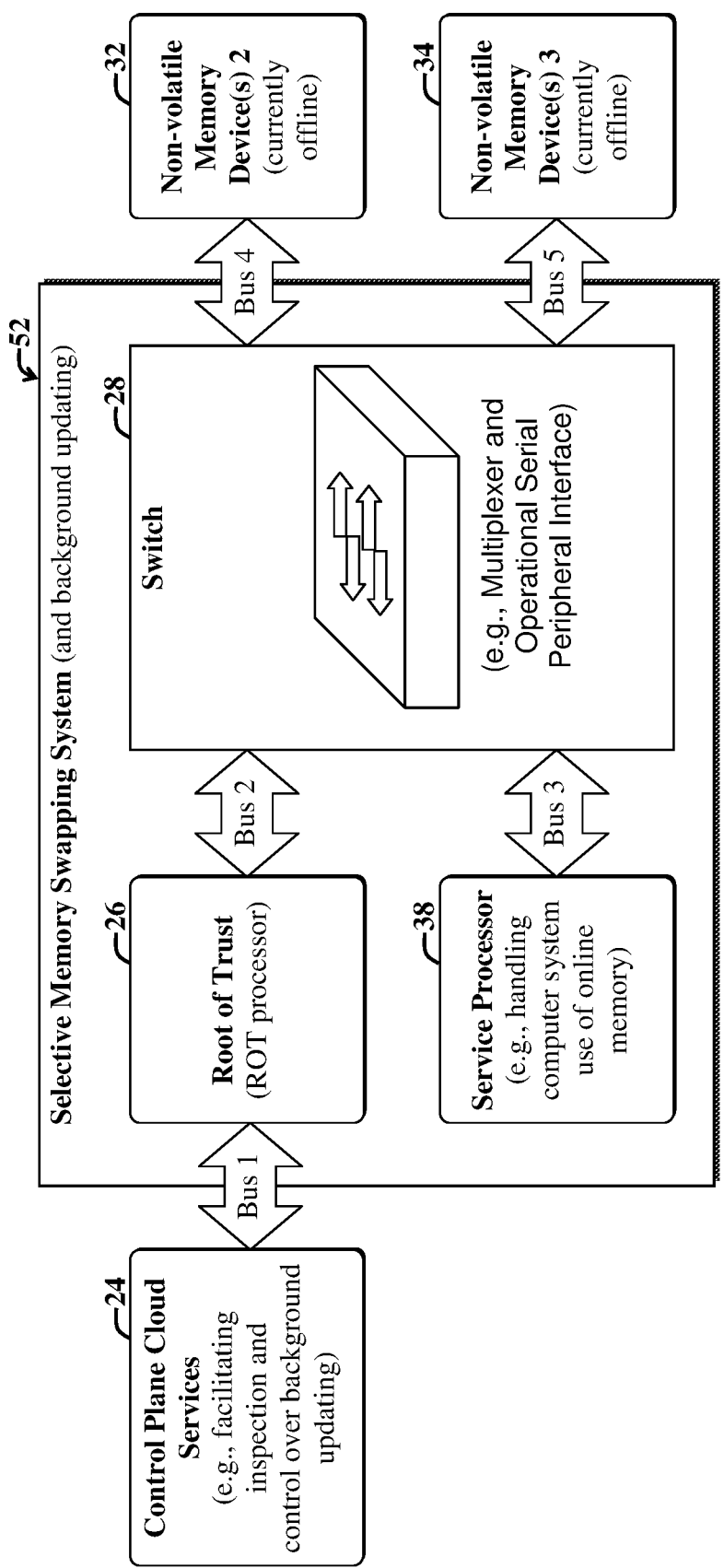
FIG. 3 illustrates example components of the memory swapping system of FIG. 2, which may be implemented via the first example system of FIG. 1.

FIG. 3 illustrates example components 26, 28, 38 of the memory swapping system 52 of FIG. 2, which may be implemented via the first example system 10 of FIG. 1. In the present example embodiment, the selective memory swapping system 52 is shown including the ROT processor 26, the service processor 38 (of the front-end processing module 18 of FIG. 1), and the switch 28 of the restoration backend 22 of FIG. 1. Note that while the first online memory device 30 of FIG. 1 is not shown in FIG. 3, the selective memory swapping system 52 also communicates with the first memory device 30 of FIG. 1.

In FIG. 3, the control plane cloud services module 24 are shown communicating with the ROT 26 of the selective memory swapping system 52 via a first bus (Bus 1). The ROT 26 communicates with the switch 28 via a second bus (Bus 2), the service processor 38 communicates with the switch 28 via a third bus (Bus 3). The switch 28 communicates with the second offline non-volatile memory 32 via a fourth bus (Bus 4). The switch further communicates with the third non-volatile memory device 34 via a fifth us (Bus 5).

Note that the switch 28 may be implemented via various technologies. Those skilled in the art with access to the present teachings may readily determine the appropriate switch architecture to meet the needs of a given implementation, without undue experimentation. In one implementation, the switch 28 can be implemented using one or more crossbar switches and/or other switching mechanism(s) for selectively switching (e.g., connecting and/or disconnecting) one or more input terminals to one more output terminals.

Figure 4:
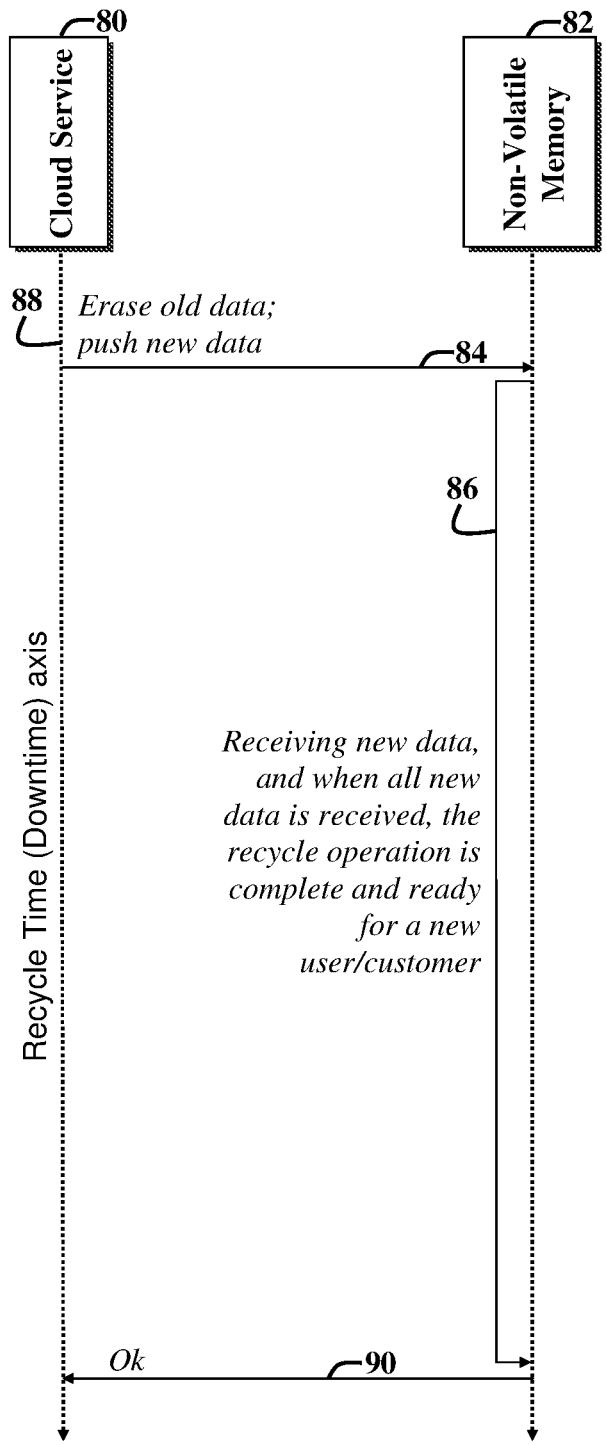
FIG. 4 is a first sequence flow diagram illustrating an example conventional approach to recycling a memory device in a computer system, necessitating substantial computer system downtime.

FIG. 4 is a first sequence flow diagram illustrating an example conventional approach to recycling a memory device 82 in a computer system via a cloud service 80, the approach of which may necessitate substantial computer system downtime, e.g., while the associated non-volatile memory 82 is recycled.

The example flow includes a vertical time axis 88, where processing time increases in duration further down the axis 88. An initial data-erasing and pushing step includes issuing an erase and push operation control 84 that then launches a memory erasure process and subsequent writing process that takes substantial time, e.g., as indicated by an indicated time duration 86.

After new data is received and written to the non-volatile memory 82, then the recycle operation (also called the background processing operation) is complete, and the non-volatile memory 82 is ready for reuse, e.g., is ready to put online as needed. An acknowledgement message 90 may be returned to the cloud service 80 to confirm that the erasure and rewriting operation completed.

However, conventionality, the entire time duration 86, represents time during which the computer system using the non-volatile memory 82 is non-operational. This represents computer downtime.

Embodiments not only substantially eliminate such downtime 86, but further provide forensics analysis functionality, and more efficient rewriting of data. For instance, depending upon the forensics analysis, not all data and firmware on the non-volatile memory device 82 necessarily must be rewritten, and sometimes no data and/or firmware will need to be written to, or rewritten to, the non-volatile memory 82. This can happen, for instance, when a first user relinquishes a computer system for use by a second user, but when no modifications were made to the non-volatile memory 82 and no data and/or firmware updates are yet available for the non-volatile memory 82.

Figure 5:
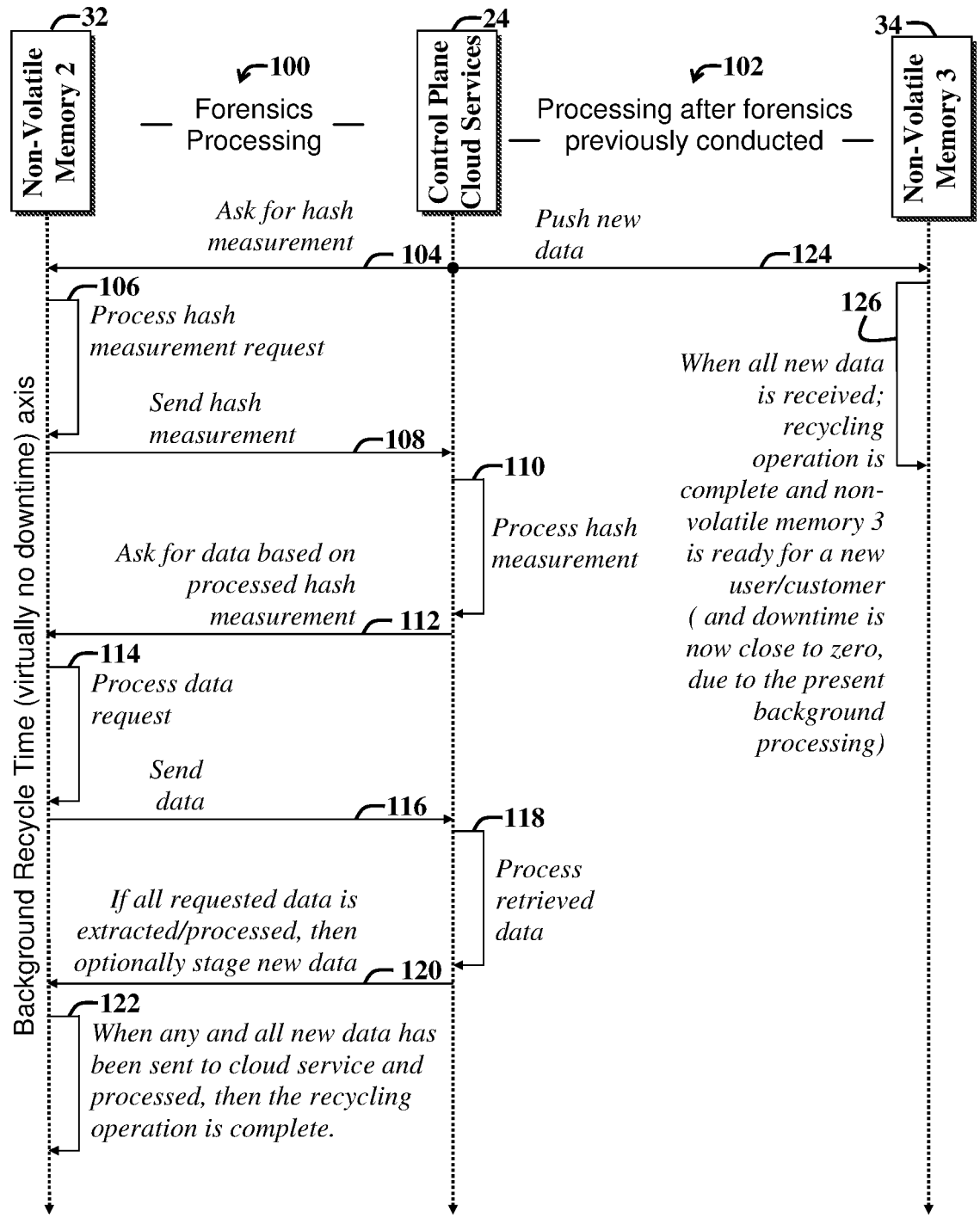
FIG. 5 is a second sequence flow diagram illustrating an example communications exchanges between the cloud service and a couple of memories of FIGS. 1-3, and further illustrating substantial time savings, including virtual elimination of computer system downtime for recycling events and memory swapping events in accordance with embodiments discussed herein.

FIG. 5 is a second sequence flow diagram illustrating an example communications exchanges 100 (and processing including forensics analysis) between the cloud service 24 and the second non-volatile memory 32, and communications exchanges 102 (without forensics steps) between the cloud service 24 and the third memory device 34 of FIGS. 1-3.

The flow of FIG. 5 further illustrates substantial time savings, including virtual elimination of computer system downtime for recycling events and memory swapping events in accordance with embodiments discussed herein.

Note that the example communications exchange between the control plane cloud services module 24 and the third memory device 34 involves the pushing of any new data (e.g., updates if available), and does not necessarily need to involve the erasure of any data (as performed in via the approach shown in FIG. 4), as the integrity of the existing data of the non-volatile memory device 34 may have already been confirmed via prior forensics analysis, via embodiments discussed herein. Note that, generally, if the integrity of the existing non-volatile memory device 34 has already been confirmed to be good (and sufficiently recent for the purposes of a particular implementation), and no software or firmware update is available, then no data needs to be erased therefrom or written thereto.

In the present example embodiment, the forensics processing 100 includes the control plane cloud services module 24 issuing a request message 104 asking the second memory device 32 for a hash measurement. The second memory device 32 then process the hash measurement request during a hash-processing step 106. After completing the hash-processing step 106 responsive to the hash request 104, the second memory device then issues a responsive hash measurement 108 back to the control plane cloud services module 24.

The control plane cloud services module 24 then processes the returned hash measurement 108 in a hash-measurement processing step 110. After completing the hash-measurement processing step 110, the control plane cloud services module 24 asks, a first data-requesting message 112, the second memory device 32 for any additional data needed based on the processed hash measurement processing 110.

The second memory device 32 then processes first data-request message 112 during a data-request processing step 114, and then sends data back to the control plane cloud services module 24 via a data-sending message 116.

The control plane cloud services module 24 then processes the retrieved data sent in the data-sending step 116, in a retrieved-data processing step 118. After completing the retrieved-data processing step 118, the control plane cloud services module 24 issues a new-data request message 120 to the second memory device 32. The second memory device 32 then processes the new-data request message 120 in an associated new-data request processing step 122.

In the present example scenario, the second memory device 32 determines, in the new-data request processing step 122, that no new data needs to be sent, or that it has already been sent. If so, then forensics analysis for the second memory device 32 is complete. A completion acknowledgement message (not shown) may then be sent from the second memory device 32 back to the control plane cloud services module 24.

Note that simultaneously or concurrently with the control plane cloud services module 24 issuing the initial hash measurement request message 104 to the second memory device 32, the control plane cloud services module 24 begins pushing new data to the previously forensically analyzed third memory device 34, e.g., via an initial push message 124.

The push message 124 is then processed by the third memory device 34 in a push-message processing step 126. Note that the push-message processing step 126 is of relatively short duration (e.g., relative to the erasing and pushing duration 86 shown in the approach of FIG. 4), as does not also require the erasing of any data that has already passed forensics inspection.

Furthermore, note that, while not shown in FIG. 5, communications between the control plane cloud services module 24 and the non-volatile memories 32, 34, may occur through the ROT 26 and switch 28, e.g., as shown in FIG. 1.

In addition, note that forensics processing 100 portion implemented by the control plane cloud services module 24 of FIG. 5 may be implemented by the accompanying inspector service or module 56 of FIG. 2. Similarly, the pushing (e.g., issuance of the push message 124) can be implemented via the memory rewriter (or writer) 58 of the control plane cloud services module 24, as shown in FIG. 2.

In summary, the second non-volatile memory 32 is checked (via forensics processing 100) for any corruption, and is validated.

The validated portions need not be erased to prepare it for pushing new data. This may save additional time, in that the pushing of new data onto the second memory device 32 can be minimized, i.e., less data may need to be pushed, as the forensically checked areas can be preserved. The pushed new data may include updates, and so on, to certain regions of the of the already forensically validated third memory device 34.

In an alternative implementation and accompanying scenario, a user or customer may have just completed executing of (i.e., using) the second memory device 32. In this alternative scenario, the third memory device 34 had already been staged with new data (e.g., and forensically analyzed) during the customer's prior use of the second memory device 32. In this case, the third memory 34 will be ready for use by a new customer, i.e., will be ready to be placed on line via the restoration backend 22 and accompanying switch 28 and ROT 26 of FIG. 1.

A new customer can then immediately begin executing off the third memory device 34 after it is switched online, while inspection and forensics are being performed on the second memory device 32. In this way, only two memories need to be included in the swapping operation.

Note however, that this alternative approach is not shown in FIG. 5, which instead shows simultaneous offline steps 104, 124 performed on the second memory device 32 and the third memory device 34. In the alternative scenario, the third memory device 34 will have already had data pushed thereto, e.g., data obtained from the source of truth 60 of FIG. 60 and then written to as needed (e.g., via the memory rewriter or writer 58 of FIG. 2), after forensics analysis e.g., corresponding to the forensics processing steps 100, as may be controlled via the control plane cloud services module 24.

Figure 6:
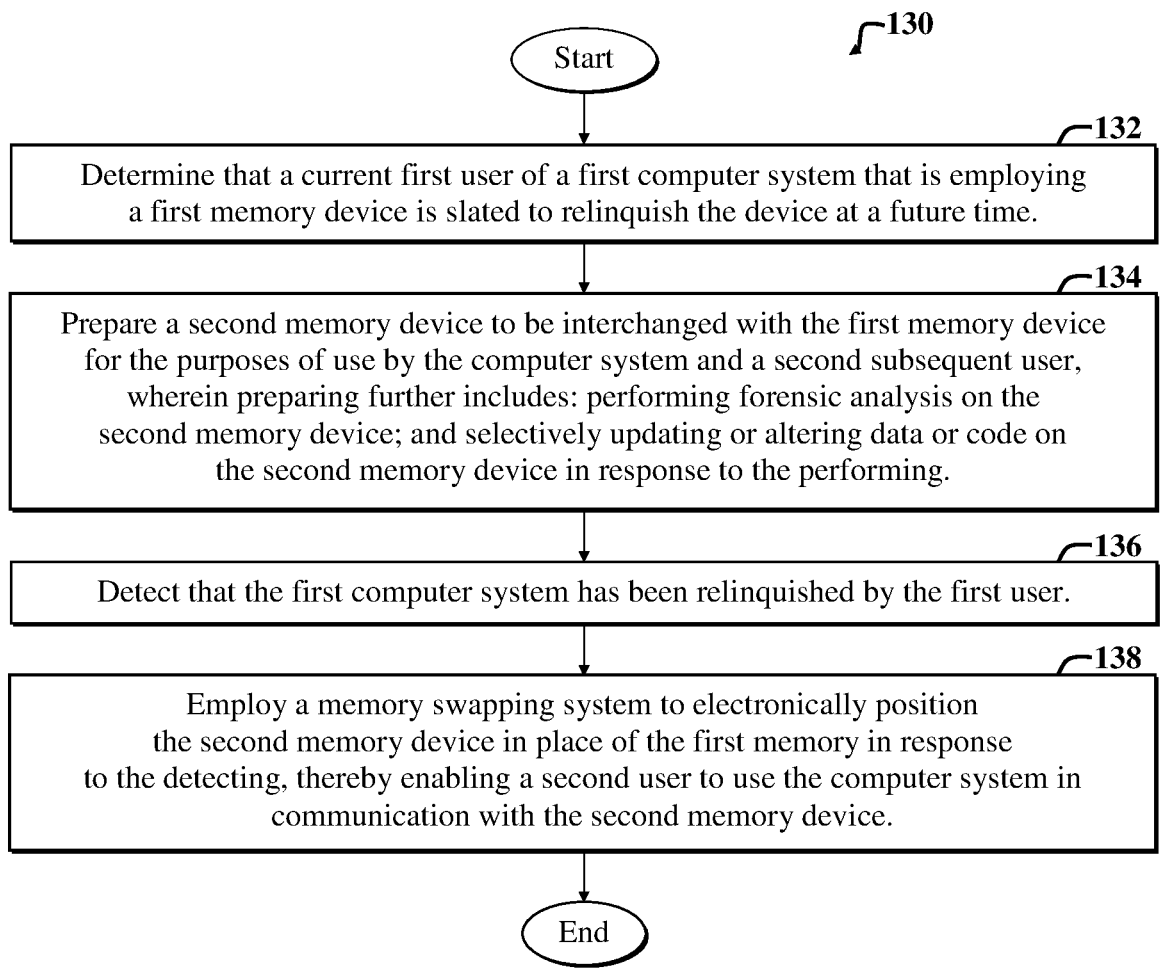
FIG. 6 is a flow diagram of a first example method suitable for use with various embodiments discussed herein.

FIG. 6 is a flow diagram of a first example method 130 suitable for use with various embodiments discussed herein. The first example method 130 facilitates selectively verifying/validating (e.g., forensics analysis) and/or updating one or more memory devices of a computer system of a computing environment in preparation for use by a subsequent user.

The first example method 130 includes a first step 132, which includes determining that a current first user of a first computer system (e.g., the first computer system 20 of FIG. 1) that is employing a first memory device (e.g., the first memory device 30 of FIG. 1) is slated to relinquish the first memory device at a future time. This can be done via a detection signal sent from one or more services running on the control plane cloud services module 24 of FIG. 1 to the ROT processor 26 of FIG. 1. The control plane cloud services module 24 of FIG. 24 may include one or more cloud services that are configured to detect when a given user has vacated or is scheduled to vacate a particular computer system (e.g., the first computer system 20 of FIG. 1), which can thereby alert one or more additional modules, e.g., the restoration backend 22, of the server system 14 of FIG. 1.

A second step 134 includes preparing a second memory device (e.g., the second memory device 32 of FIG. 1) to be interchanged with the first memory device (e.g., the first memory device 30 of FIG. 1) in preparation for use thereof by the first computer system and a second subsequent user.

The preparing, implemented via the second step 134, may further include performing forensics analysis (e.g., via the ROT 26 of FIG. 1, at the direction of one or more signals from the control plane cloud services module 24 of FIGS. 1 and 2, e.g., from the inspector module 56 of FIG. 2); on the second memory device (e.g., the second memory device 32 of FIG. 1), and then selectively updating or altering data or code on the second memory device in response to the performing.

A third step 136, includes detecting that the first computer system has been relinquished by the first user. This detection may also be obtained by the restoration back end 22 of FIG. 1 via signaling from the control plane cloud services module 24, which may incorporate one or more cloud services for performing such detection.

A fourth step 138 includes employing a memory swapping system (e.g., the swapping system 52 of FIG. 3) to electronically position the second memory device in place of the first memory in response to the detecting, thereby enabling a second user to use the computer system in communication with the second memory device.

Note that the first example method 130 may be modified, without departing from the scope of the present teachings, e.g., additional steps may be added, modified, swapped with other steps, and so on.

For example, the first example method 130 may be modified to further specify a step of employing a cloud service to communicate with the memory swapping system to facilitate preparing the second memory device to be interchanged with the first memory device; including employing the cloud service to communicate with a Root of Trust (ROT) (e.g., corresponding to the ROT processor 26 of FIG. 1) of the memory swapping system to facilitate the forensics analysis and the selectively updating or altering data.

The first example method 130 may further specify employing the ROT processor communication with a switch (e.g., the switch 28 of FIG. 1) to facilitate interchanging the first memory device with the second memory device.

The first example method 130 may further specify use of a service processor (e.g., the service processor 38 of FIG. 1) in communication with the switch to facilitate interfacing one or more operations of the computer system initiated by a user of the computer system, with the first memory device or the second memory device, depending upon whether the first memory device or the second memory device, respectively, has been prepared for use by the computer system. This happens when the first memory device or the second memory device are placed online, e.g., via the ROT processor and the accompanying switch of a restoration backend (e.g., the restoration backend 22 of FIG. 1).

The first example method 130 may further specify, in response to the detecting: taking the first memory device offline, while placing the second memory device online; conducting forensics analysis on the first memory device, and producing forensics results in response thereto; using the forensics results to determine data to subsequently write to the first memory device; selectively writing new data to a third memory device that has undergone forensics processing to determine the new data that should be written to the third memory device, so as to prepare the third memory device for electronically positioning in place of the second memory device when the second memory device and accompanying computer system are relinquished by a second user; detecting that the second user has relinquished the computer; and electronically positioning the third memory device in place of the second memory device, such that: the second memory device is taken offline in preparation for forensics analysis; the third memory device is placed online for use by the computer system and a third user; and the first memory device is positioned in preparation for rewriting or updating data thereto, so as to prepare the prepared second memory device for use by a forth user, upon relinquishing of the computer system and the third memory device used by the third user.

The first memory device and the second memory device may represent non-volatile memories. The computing environment may be a networked computing environment, such as a cloud-based computing environment.

The forensics analysis may include: employing one or more hashes or Cyclic Redundancy Checks (CRC), or other codes to ascertain an indication as to whether or not a set of data and/or computer code has been modified or otherwise tampered, replaced, or augmented on the first memory device or the second memory device.

Figure 7:
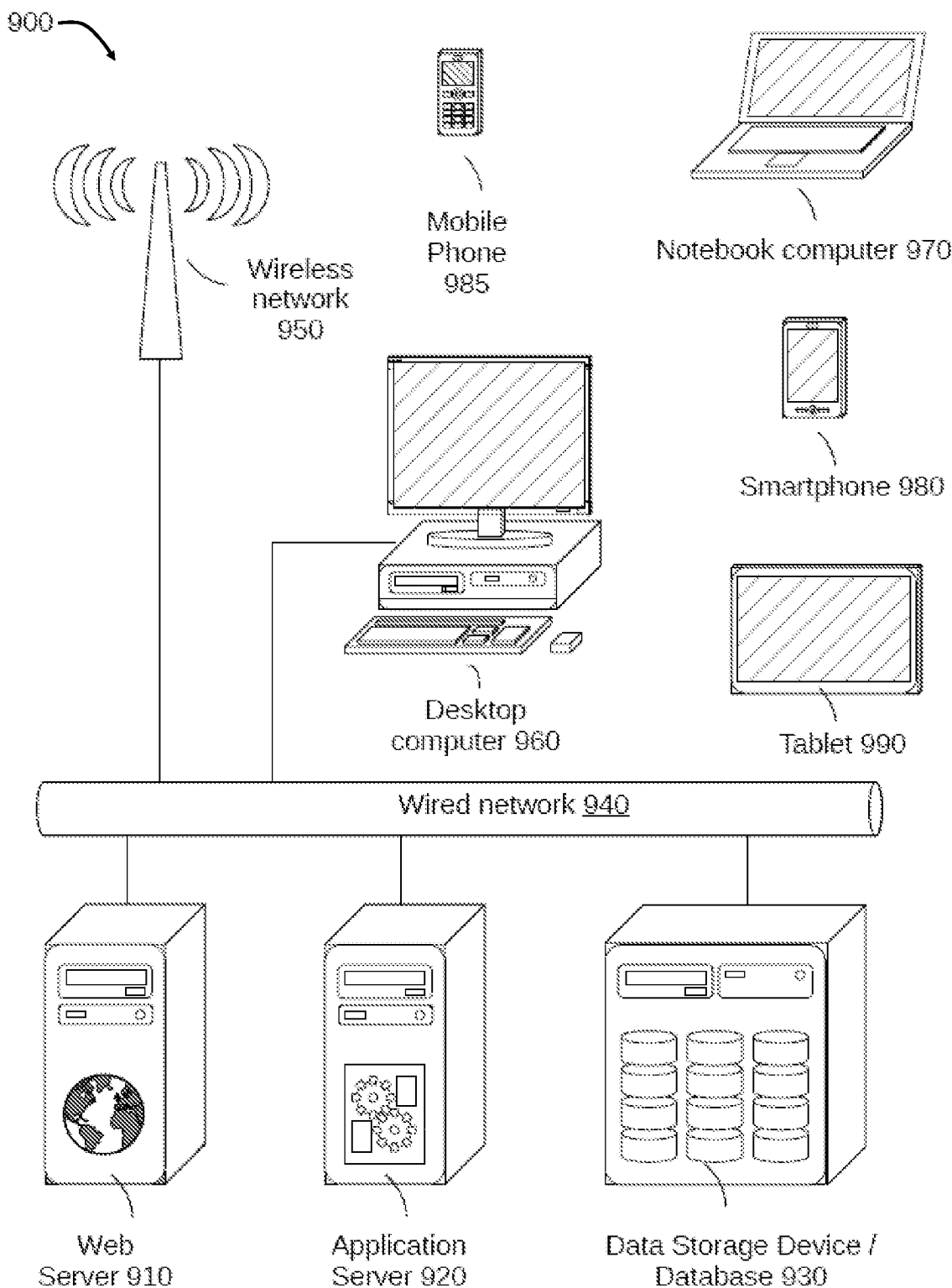
FIG. 7 illustrates a block diagram of an example network environment, which may be used for implementations described herein.

FIG. 7 is a general block diagram of a system 900 and accompanying computing environment usable to implement the embodiments of FIGS. 1-6. Embodiments may be implemented as standalone applications (for example, residing in a user device) or as web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as RSS feeds, of data related to enterprise operations.

An application server 920 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HypefText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computers.

An electronic communication network 940-950 enables communication between user computing devices 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system 900 is one example for executing applications according to an embodiment of the invention. In another embodiment, application server 920, web server 910, and optionally database 930 can be combined into a single server computer application and system. In a further embodiment, virtualization and virtual machine applications may be used to implement one or more of the application server 920, web server 910, and database 930.

In still further embodiments, all or a portion of the web and application serving functions may be integrated into an application running on each of the user computers. For example, a JavaScript application on the user computer may be used to retrieve or analyze data and display portions of the applications.

With reference to FIGS. 1 and 7, the client system(s) 12 of FIG. 1 may be implemented via one or more of the desktop computer 960, tablet 990, smartphone 980, notebook computer 970, and/or mobile phone 985 of FIG. 7. The server system 14 of FIG. 1 and accompanying modules 18-28 may be implemented via the web server 910 and/or application server 920 of FIG. 7. The source of truth 60 of FIG. 2 may be implemented using the data storage device 930 of FIG. 7.

Figure 8:
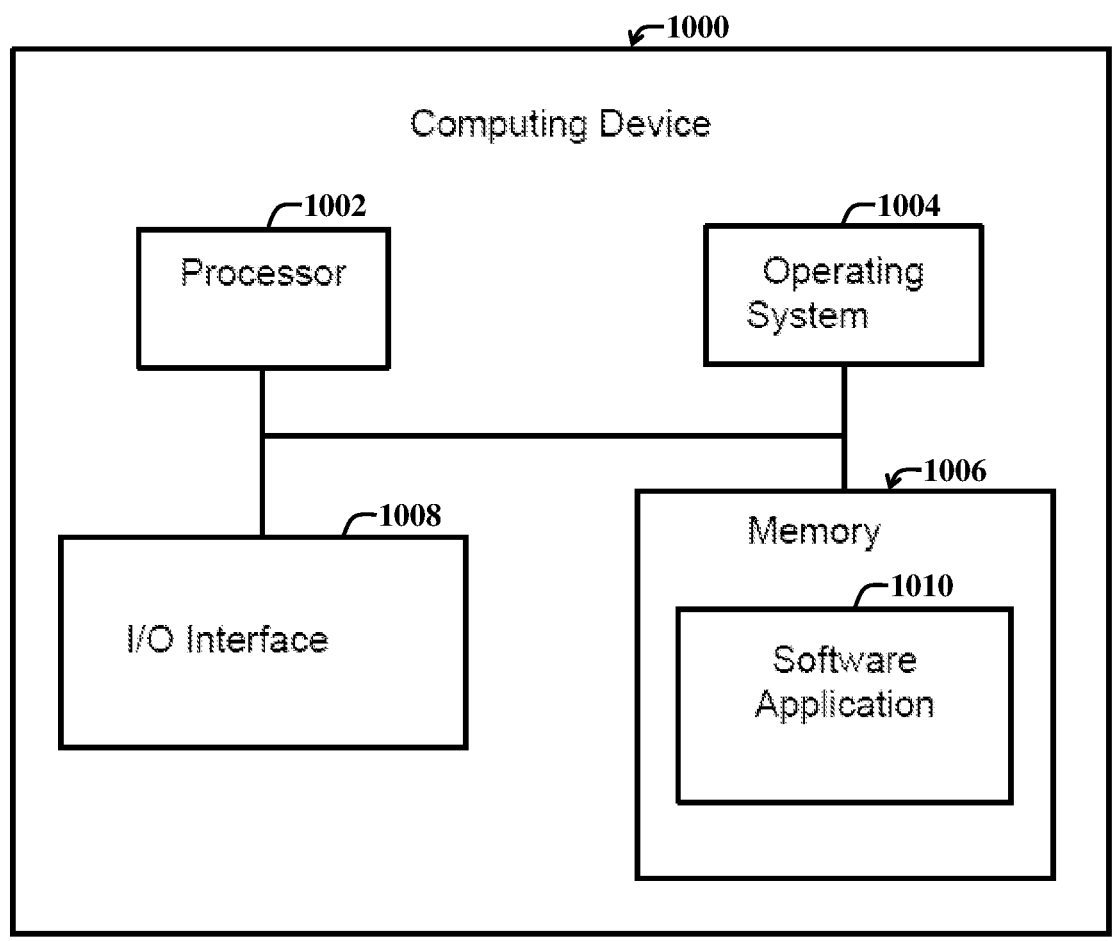
FIG. 8 illustrates a block diagram of an example computing device or system, which may be used for implementations described herein.

FIG. 8 illustrates a block diagram of an example computing device or system 500, which may be used for implementations described herein. For example, the computing device 1000 may be used to implement server devices 910, 920 of FIG. 7 as well as to perform the method implementations described herein. In some implementations, the computing device 1000 may include a processor 1002, an operating system 1004, a memory 1006, and an input/output (I/O) interface 1008.

In various implementations, the processor 1002 may be used to implement various functions and features described herein, as well as to perform the method implementations described herein. While the processor 1002 is described as performing implementations described herein, any suitable component or combination of components of the computing device 1000 or any suitable processor or processors associated with the device 1000 or any suitable system may perform the steps described. Implementations described herein may be carried out on a user device, on a server, or a combination of both.

The example computing device 1000 also includes a software application 1010, which may be stored on memory 1006 or on any other suitable storage location or computer-readable medium. The software application 1010 provides instructions that enable the processor 1002 to perform the functions described herein and other functions. The components of computing device 1000 may be implemented by one or more processors or any combination of hardware devices, as well as any combination of hardware, software, firmware, etc.

For ease of illustration, FIG. 8 shows one block for each of processor 1002, operating system 1004, memory 1006, I/O interface 1008, and software application 1010. These blocks 1002, 1004, 1006, 1008, and 1010 may represent multiple processors, operating systems, memories, I/O interfaces, and software applications. In various implementations, the computing device 1000 may not have all of the components shown and/or may have other elements including other types of components instead of, or in addition to, those shown herein.

Although the description has been described with respect to particular embodiments thereof, these particular embodiments are merely illustrative, and not restrictive. For instance, although features may be described with respect to specific types of resources or operations, e.g., non-volatile memory, the features described herein may be applicable to other cloud computing resources and operations.

Furthermore, while cloud computing is one example of a computing system described, where the memory restoration system may be implemented by a motherboard, the present memory restoration system may be employed in other computing environments in which a memory device or other electronic hardware is updated in the background. For example, network cards, hard drives, etc. may be updated without interfering with currently executing software.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a non-transitory medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory processor-readable medium including instructions executable by one or more processors of a cloud-based computing environment, and when executed operable for:

providing a first client system of a first user, access to a computer system employing a first memory device of a cloud-based server system;

while the first memory device is in use by the computer system, preparing, by a back end of the cloud-based server system, a second memory device to be interchanged with the first memory device for use by the computer system by a second client system of a second user subsequent to the first user, wherein preparing the second memory device includes:

performing forensics analysis, by the back end, on data or code on the second memory device;

replacing, by the back end, selective portions of data or code on the second memory device in which integrity has been unconfirmed by the forensics analysis of the second memory device; and maintaining, by the back end, other portions of the data or code that have been forensically checked and in which integrity has been confirmed by the forensics analysis;

while the first memory device is in use by the computer system, preparing, by the back end, a third memory device to be interchanged with the second memory device for use of the computer system by a third client system of a third user subsequent to the second user, wherein preparing the third memory device includes performing forensics analysis on the third memory device to confirm integrity of data or code of the third memory device;

detecting a relinquishing event that the computer system is relinquished by the first client system; and employing a memory swapping system to electronically position, via a switch, the second memory device in place of the first memory device in response to detecting the relinquishing event, thereby enabling the second client system of the second user to use the computer system employing the second memory device.

2. The non-transitory processor-readable medium of claim 1, further including:
employing a cloud service to communicate with the memory swapping system to facilitate preparing the second memory device to be interchanged with the first memory device.

3. The non-transitory processor-readable medium of claim 2, further including:
employing the cloud service to communicate with a Root of Trust (ROT) of the memory swapping system to facilitate the forensics analysis and the replacing of data or code on the second memory device in response to the performing.

4. The non-transitory processor-readable medium of claim 2, wherein
detecting the relinquishing event includes sending a detection signal to a Root of Trust (ROT) processor, and wherein
employing the memory swapping system includes, in response to the ROT processor receiving the detection signal, directing the ROT processor to activate the switch to interchange the first memory device with the second memory device.

5. The non-transitory processor-readable medium of claim 4, wherein enabling the second user to use the computer system in communication with the second memory device includes employing a service processor in communication with the switch to facilitate interfacing one or more operations of the computer system initiated by a user of the computer system, with the second memory device.

6. The non-transitory processor-readable medium of claim 1, wherein the first memory device and the second memory device represent non-volatile memories.

7. The non-transitory processor-readable medium of claim 6, wherein the tangible processor-readable medium is incorporated in a networked computing environment.

8. The non-transitory processor-readable medium of claim 7, wherein the computing environment includes a cloud-based computing environment.

9. The non-transitory processor-readable medium of claim 1, wherein forensics analysis includes:
employing one or more hashes or Cyclic Redundancy Checks (CRC) to ascertain an indication as to whether or not a set of data and/or computer code has been modified or otherwise tampered, replaced, or augmented on the first memory device or the second memory device.

10. A method for facilitating selectively validating and/or updating one or more memory devices of a computer system of a cloud-based computing environment in preparation for use by a subsequent user, the method comprising:
providing a first client system of a first user, access to a computer system employing a first memory device of a cloud-based server system:
while the first memory device is in use by the computer system, preparing, by a back end of the cloud-based server system, a second memory device to be interchanged with the first memory device for use by the computer system by a second client system of a second user subsequent to the first user, wherein preparing the second memory device includes:
performing forensics analysis, by the back end, on data or code on the second memory device;
replacing by the back end, selective portions of data or code on the second memory device in which integrity has been unconfirmed by forensics analysis of the second memory device; and
maintaining, by the back end, other portions of the data or code that have been forensically checked and in which integrity has been confirmed by the forensics analysis;
while the first memory device is in use by the computer system, preparing, by the back end, a third memory device to be interchanged with the second memory device for use of the computer system by a third client system of a third user subsequent to the second user, wherein preparing the third memory device includes performing forensics analysis on the third memory device to confirm integrity of data or code of the third memory device;
detecting a relinquishing event that the computer system is relinquished by the first client system; and
employing a memory swapping system to electronically position, via a switch, the second memory device in place of the first memory device in response to detecting the relinquishing event, thereby enabling the second client system of the second user to use the computer system employing with the second memory device.

11. The method of claim 10, further including:
employing a cloud service to communicate with the memory swapping system to facilitate preparing the second memory device to be interchanged with the first memory device.

12. The method of claim 11, further including:
employing the cloud service to communicate with a Root of Trust (ROT) of the memory swapping system to facilitate the forensics analysis and replacing of the data or code on the second memory device in response to the performing.

13. The method of claim 11, further including:
employing a Root of Trust (ROT) processor in communication with a switch to facilitate interchanging the first memory device with the second memory device.

14. The method of claim 13, further including:
a service processor in communication with the switch to facilitate interfacing one or more operations of the computer system initiated by a user of the computer system, with the first memory device or the second memory device, depending upon whether the first memory device or the second memory device, respectively, has been prepared for use by the computer system.

15. The method of claim 10, wherein the first memory device and the second memory device represent non-volatile memories.

16. The method of claim 15, wherein the computing environment includes
a cloud-based computing environment.

17. The method of claim 10, wherein forensics analysis includes:
employing one or more hashes or Cyclic Redundancy Checks (CRC) to ascertain an indication as to whether or not a set of data and/or computer code has been modified or otherwise tampered, replaced, or augmented on the first memory device or the second memory device.

18. An apparatus comprising:
one or more hardware processors; and
logic encoded in one or more tangible media for execution by the one or more processors and when executed operable for:
providing a first client system of a first user, access to a computer system employing a first memory device of a cloud-based server system;
while the first memory device is in use by the computer system, preparing, by a back end of the cloud-based server system, a second memory device to be interchanged with the first memory device for use by the computer system by a second client system of a second user subsequent to the first user, wherein preparing the second memory device includes:
  performing forensics analysis, by the back end, on data or code on the second memory device;
  replacing by the back end, selective portions of data or code on the second memory device in which integrity has been unconfirmed by forensics analysis of the second memory device; and
  maintaining, by the back end, other portions of the data or code that have been forensically checked and in which integrity has been confirmed by the forensics analysis;
while the first memory device is in use by the computer system, preparing a third memory device to be interchanged with the second memory device for use of the computer system by a third client system of a third user subsequent to the second user, wherein preparing the third memory device includes performing forensics analysis on the third memory device to confirm integrity of data or code of the third memory device;
detecting a relinquishing event that the computer system is relinquished by the first client system; and
employing a memory swapping system to electronically position, via a switch, the second memory device in place of the first memory device in response to detecting the relinquishing event, thereby enabling the second client system of the second user to use the computer system employing with the second memory device.

* * * * *

UNITED STATES PATENT AND TRADEMARK OFFICE
CERTIFICATE OF CORRECTION

| | |
|---|---|
| PATENT NO. | : 11,620,076 B2 |
| APPLICATION NO. | : 17/074379 |
| DATED | : April 4, 2023 |
| INVENTOR(S) | : Vrooman et al. |

It is certified that error appears in the above-identified patent and that said Letters Patent is hereby corrected as shown below:

In the Specification

In Column 13, Line 10, delete "of the of the" and insert -- of the --, therefor.

In Column 15, Line 48, delete "HypefText" and insert -- HyperText --, therefor.

In the Claims

In Column 19, Line 62, in Claim 10, delete "system:" and insert -- system; --, therefor.

Signed and Sealed this
Thirteenth Day of February, 2024

Katherine Kelly Vidal
*Director of the United States Patent and Trademark Office*